(12) United States Patent
Haida et al.

(10) Patent No.: US 9,360,669 B2
(45) Date of Patent: Jun. 7, 2016

(54) DISPLAY DEVICE

(75) Inventors: Stefan Haida, Remscheid (DE); Jeetendra Khare, Akurdi Pune (IN); Vaibhav Anagal, Pune (IN)

(73) Assignee: JOHNSON CONTROLS GMBH, Burscheid (DE)

( * ) Notice: Subject to any disclaimer, the term of this patent is extended or adjusted under 35 U.S.C. 154(b) by 148 days.

(21) Appl. No.: 14/239,128

(22) PCT Filed: Aug. 17, 2012

(86) PCT No.: PCT/EP2012/066128
§ 371 (c)(1),
(2), (4) Date: Oct. 23, 2014

(87) PCT Pub. No.: WO2013/024165
PCT Pub. Date: Feb. 21, 2013

(65) Prior Publication Data
US 2015/0092278 A1    Apr. 2, 2015

(30) Foreign Application Priority Data

Aug. 18, 2011 (DE) .......................... 10 2011 111 007
Nov. 18, 2011 (DE) .......................... 10 2011 118 853

(51) Int. Cl.
*G02B 27/14* (2006.01)
*G02B 27/01* (2006.01)

(52) U.S. Cl.
CPC .... *G02B 27/0149* (2013.01); *G02B 2027/0154* (2013.01); *G02B 2027/0156* (2013.01); *G02B 2027/0183* (2013.01)

(58) Field of Classification Search
USPC ....................................... 359/630–632; 345/7
See application file for complete search history.

(56) References Cited

U.S. PATENT DOCUMENTS

| 7,869,129 B2* | 1/2011 | Lebreton ................ B60K 35/00 345/7 |
| 7,978,414 B2 | 7/2011 | Potakowskyj et al. |
| 8,488,246 B2* | 7/2013 | Border ................. G02B 27/017 353/28 |
| 2006/0050018 A1 | 3/2006 | Hutzel et al. |
| 2007/0290536 A1 | 12/2007 | Nathan et al. |
| 2008/0285138 A1 | 11/2008 | Lebreton |

FOREIGN PATENT DOCUMENTS

| DE | 640 435 | 1/1937 |
| DE | 10 2006 011 512 A1 | 9/2007 |
| DE | 10 2007 017 505 A1 | 12/2007 |
| WO | WO 98/20380 | 5/1998 |
| WO | WO 2007/057608 A1 | 5/2007 |
| WO | WO 2008/063632 A2 | 5/2008 |

OTHER PUBLICATIONS

Examination Report issued in related German Patent Application No. 10 2011 118 853.7, dated May 22, 2012.
International Search Report issued in related International Patent Application No. PCT/EP2012/066128, completed Oct. 19, 2012.
International Preliminary Report on Patentability in PCT/EP2012/066128.

* cited by examiner

*Primary Examiner* — Mohammed Hasan
(74) *Attorney, Agent, or Firm* — Foley & Lardner, LLP

(57) ABSTRACT

A display device, particularly for a vehicle, includes a base element and a combiner. The combiner moves by a drive mechanism between a position for use, in which a virtual image can be projected onto the combiner, and a stowed position. The drive mechanism includes a translation mechanism.

9 Claims, 2 Drawing Sheets

DISPLAY DEVICE

The present application is a U.S. National Phase of International Patent Application No. PCT/EP2012/066128, filed Aug. 17, 2012, which claims priority from German Patent Application Nos. 10 2011 111 007.4, filed Aug. 18, 2011, and 10 2011 118 853.7, filed Nov. 18, 2011. The contents of these applications are incorporated herein by reference in their entirety.

BACKGROUND

The present invention is based on a display device, in particular a head-up display, having an illumination means, an imaging unit and a redirection means.

Such head-up displays (referred to below as "HUD") are generally known and have already been used for many years in aircraft cockpits and motor vehicles in order to provide for the pilot or the driver in a particularly pleasant manner information, for example, status displays, relating to the operating state of the aircraft or vehicle. In order to display the information, there is produced a virtual image which contains the information and which is projected either directly onto a windshield of the vehicle or onto a separate combiner which is arranged in the field of vision of the driver. Such a combiner (that is to say, combiner of information) typically comprises a reflective and light-permeable pane so that the driver can see through the combiner and consequently the virtual image projected onto the combiner is superimposed with corresponding environmental information appearing through the combiner. This has the advantage that, in spite of the use of a separate display pane which with regard to its configuration can be adapted primarily to a high-quality display of the virtual image, the field of vision of the driver is virtually unimpaired. Such a display device is known, for example, from the publication DE 20 2006 020 591 U1.

Such combiners are required primarily only when the vehicle is in a driving state and the driver therefore requires current information, for example, relating to the vehicle state of a navigation system, an entertainment system, a telephone or the like. For this reason, it is desirable for the combiner to be able to be moved between a position for use, in which the combiner is arranged to display the virtual image in a field of vision of the driver, and a stowed position in which the combiner is located in a position which is retracted with respect to the position for use and which is in particular protected.

An object of the present invention is therefore to provide a display device in which the combiner can be moved in a simple, reliable and secure manner between the position for use and the stowed position, and which can be produced in a comparatively cost-effective manner. Furthermore, an object of the present invention is to achieve a comparatively fluid and attractive movement of the combiner.

SUMMARY

This object is achieved according to the invention by a display device, in particular for a vehicle, which comprises a base element and a combiner which can be moved relative to the base element, wherein the combiner can be moved by means of a drive mechanism between a position for use, in which a virtual image can be projected onto the combiner, and a stowed position, wherein the drive mechanism comprises a translation mechanism.

The translation mechanism changes, in particular extends, the positioning path of the drive, in particular a linear drive, which may, for example, thereby be constructed to be smaller. The translation ratio can preferably be changed. Different display devices can thereby be provided with the same drive.

This translation mechanism is preferably a scissor mechanism.

With the display device according to the invention, the combiner is driven by means of the translation mechanism, in particular a scissor articulation, to carry out a movement from the stowed position into the position for use and vice versa. The use of a scissor articulation has the advantage that a comparatively compact, robust and cost-effective drive mechanism is produced. Another advantage is that the drive mechanism can be adapted in a comparatively simple manner to the specific spatial requirements, in particular in a vehicle. For example, to this end, only the number of members and/or the length of the individual members of the scissor articulation have to be adapted accordingly.

A scissor articulation in the context of the present invention comprises in particular an arrangement of at least two intersecting rods (also referred to as scissor members) which are rotatably connected to each other in the central region thereof, that is to say, the two intersecting rods are assembled in the manner of a pair of scissors. Such an arrangement is referred to below as a member of the scissor articulation, the scissor articulation preferably being composed of a plurality of members which are connected one behind the other and the rods of two adjacent members each being connected to each other in a rotationally movable manner at the mutually facing end locations of the rods. If, for example, the free end locations of the two rods of the first member are pressed together, the two corresponding rods are rotated relative to each other in such a manner that the angle between the rods becomes increasingly acute and this member expands in the longitudinal direction, that is to say, when the pair of scissors is closed, the longitudinal extent thereof increases. The two opposing end locations of the two rods are also thereby moved closer to each other, whereby the next member of the scissor articulation is compressed in a similar manner. In this manner, all the members of the scissor articulation are closed at the same time and the entire scissor articulation expands in the longitudinal direction into the extended position thereof. In the reverse manner, all the members of the scissor articulation open and the scissor articulation is compressed in the longitudinal direction into the retracted position thereof again when the two end locations of the first member are separated from each other again in a transverse direction perpendicular relative to the longitudinal direction.

According to a preferred embodiment, there is provision for the display device to have a drive, in particular a rotary drive, for example, a rotary cam, or a linear drive which is provided in order to actuate the translation mechanism, preferably of the scissor articulation, and in particular the first member of the scissor articulation. There is preferably provision for the drive, in particular a linear drive, to engage at an intersection location of the two rods of the first member and to move the intersection location in order to actuate the scissor articulation in the longitudinal direction, whilst an end location of the first member is fixed to the base element. The scissor articulation consequently acts in particular as a translation means in order to translate a comparatively small movement of the drive, for example, in the longitudinal direction, into a larger movement, for example, in the longitudinal direction of the display device. Alternatively, the drive is preferably coupled to at least one of the end locations of the two rods of the first member in such a manner that the two end locations can be moved relative to each other and perpendicularly relative to the longitudinal direction. It is further conceivable for one of the two end locations of the first member to be rotatably secured to the base element, whilst the other end location is moved by means of the drive either in a translatory manner in the direction of the end location which is secured to the base element or in a translatory manner counter to the direction of the end location which is secured to the base element away from this end location.

The linear drive preferably comprises a linear motor, a threaded rod drive or a rack and pinion drive, in particular in each case driven by an electric motor.

Naturally, it would also be conceivable for the linear drive to comprise a piston/cylinder drive or an electric linear cylinder.

According to a preferred embodiment of the present invention, there is provision for the drive mechanism to be at least partially produced from a material which comprises a shape memory alloy. The scissor mechanism and in a particularly preferred manner the members or rods of the scissor mechanism are produced from a material which comprises a shape memory alloy. The material preferably comprises a memory metal (also referred to as SMA material "shape memory alloy").

According to a preferred embodiment of the present invention, there is provision for the drive mechanism to have a control unit which is configured to apply a control current to the shape memory alloy. Advantageously, a movement of the drive mechanism is brought about by the control current. Consequently, a drive which is particularly energy-saving, low-maintenance and compact in comparison with the prior art can be produced. In particular, in addition to the scissor mechanism, no additional, external, mechanical drive is required. In particular, an external drive is not obligatory when the scissor elements are produced from the SMA material and thus, with selective application of current, the defined movement within the required trajectories and consequently of the combiner are brought about.

According to another preferred embodiment of the present invention, there is provision for the drive to comprise a bionic operating principle. The combination of new types of materials, for example, SMA, EAP (electro active polymer), with conventional electromotive or spring-operated drives is also conceivable in order to reproduce operating principles from nature (in specific terms: Bryozoa) and to convert them in accordance with transfer functions from bionics into a technical solution for the HUD drive, which inter alia also results in advantages during energy consumption of such a combination system. It is also conceivable for the drive mechanism to comprise hydraulic and/or pneumatic drives. Preferably, such hydraulic and/or pneumatic drives are combined with new types of EAP-based drive units. The drive concepts described above are intended to achieve a substantially smaller structural space, with respect to the prior art, and to ensure significantly noise-reduced and dynamically optimized movement processes with, at the same time, a large trajectory range of the combiner.

According to a preferred embodiment, there is provision for the combiner to be secured to a securing element, the securing element being secured to a second member of the scissor articulation. The second member is in particular arranged at an end of the scissor articulation facing away from the first member in the longitudinal direction. An actuation of the scissor articulation by means of the drive consequently leads to a displacement of the securing element parallel or anti-parallel with the longitudinal direction since the securing element is also moved with the second member in the longitudinal direction. The movement of the securing element then leads to the displacement/pivoting of the combiner between the position for use and the stowed position. At least one additional member, preferably a plurality of additional members, may be arranged between the first and the second member of the scissor articulation.

The combiner preferably comprises an at least partially reflective and light-permeable pane which is retained by the securing element. This pane is preferably provided so as to comprise plastics material, in particular a plastics material which does not splinter or form sharp edges in the event of failure, in order to reduce the risk potential of the display device according to the invention.

In the position for use, the combiner is preferably moved into a field of vision of a vehicle occupant. The vehicle occupant can in this instance preferably see through the combiner and consequently perceive environmental information appearing through the combiner in an almost unlimited manner. At the same time, in the position for use, a virtual image can be projected onto the combiner by means of a projection unit of the display device in order, for example, to indicate vehicle information or the like to the driver. The display device is preferably integrated in a vehicle interior equipment component, for example, a dashboard or a central console. In the position for use, the combiner preferably protrudes from the vehicle interior equipment component perpendicularly or obliquely in particular in the direction of a windshield of the vehicle into the vehicle inner space, while the combiner in the stowed position is preferably retracted completely into the vehicle interior equipment component through an opening in the vehicle interior equipment component.

According to a preferred embodiment or an embodiment according to the invention, there is provision for the display device to be constructed in such a manner that the combiner, when moving from the stowed position into the position for use, carries out a combination of a linear movement in the longitudinal direction of the device according to the invention and a pivot/rotational movement about a pivot axis perpendicular relative to the longitudinal direction. Preferably, both movements are brought about by the same drive mechanism. To this end, the securing element of the combiner preferably has lateral guiding elements which are guided in lateral guiding rails of the base element and which are preferably supported in a rotationally movable manner. Alternatively or in addition, one or more rotational/pivot bearings are provided on the securing element and/or on the guiding element.

The guiding rails preferably have such a curvature that the guiding elements in the position for use have a larger spacing with respect to a base plate of the base element than in the stowed position. In a direction perpendicular relative to the base plate of the base element, consequently, the guiding rails and the scissor articulation preferably do not extend strictly parallel with each other, but instead the spacing between the extended scissor articulation and the guiding rails preferably changes in the direction perpendicular relative to the base plate, in particular continuously, in the longitudinal direction.

The securing element is preferably secured at a securing location to at least one end location of the second member, the guiding elements preferably being arranged between the combiner and the securing location parallel with a longitudinal direction of the combiner, in particular parallel with the main extent plane of the combiner. In particular, the guiding elements are arranged perpendicularly relative to the base plate in the position for use and, in the stowed position, arranged at another angle, preferably substantially horizontally with respect to each other preferably between the combiner and the securing location. This has the advantage that, when moving between the position for use and the stowed position, a torque can be applied to the securing element and consequently also to the combiner, whereby the combiner is moved into the field of vision in particular in a linear manner and is pivoted at the same time or sequentially. The combiner can consequently be moved through a comparatively narrow opening in the vehicle interior equipment component into the position for use.

Alternatively or additionally, each guiding element has two guiding means, for example, pins which are supported separately from each other in the guiding rail and at least partially travel different paths from the stowed position into the position for use. A combined linear and rotational/pivot movement of the combiner is thereby possible.

Other details, features and advantages of the invention will be appreciated from the drawings and from the following description of preferred embodiments with reference to the drawings. In this instance, the drawings illustrate only exemplary embodiments of the invention which do not limit the significant concept of the invention.

BRIEF DESCRIPTION OF THE FIGURES

In the drawings:

In the various figures, components which are the same are always given the same reference numerals and are therefore also generally mentioned only once in each case.

FIGS. 1 and 2 are schematic perspective views of a display device 1 according to an exemplary embodiment of the present invention. The display device 1 comprises a base element 2 which can be integrated in an interior equipment component of a vehicle, which component is not illustrated. The base element 2 has securing flaps 3 for securing to the interior equipment component. The display device 1 further has a combiner which comprises a reflective and light-permeable pane. The combiner 4 can be moved between a position for use (illustrated in FIGS. 1, 2 and 3) and a stowed position (not illustrated). In the stowed position, the combiner 4 is orientated substantially parallel with a base plate 5 of the base element 2 and is located substantially at the inner side of the base element 2. In the position for use illustrated, the combiner 4 is deployed from the base element 2, the combiner 4 being orientated substantially perpendicularly relative to the base plate 5 and protruding into a field of vision of the vehicle occupant. The combiner 4 protrudes in particular from the interior equipment component perpendicularly or in an oblique manner in particular in the direction of a windshield of the vehicle into the vehicle inner space. In the position for use, a virtual image can be projected onto the combiner 4 by means of a projection unit which is not illustrated in order to indicate to the vehicle occupant, for example, vehicle information or the like.

Figure 1:
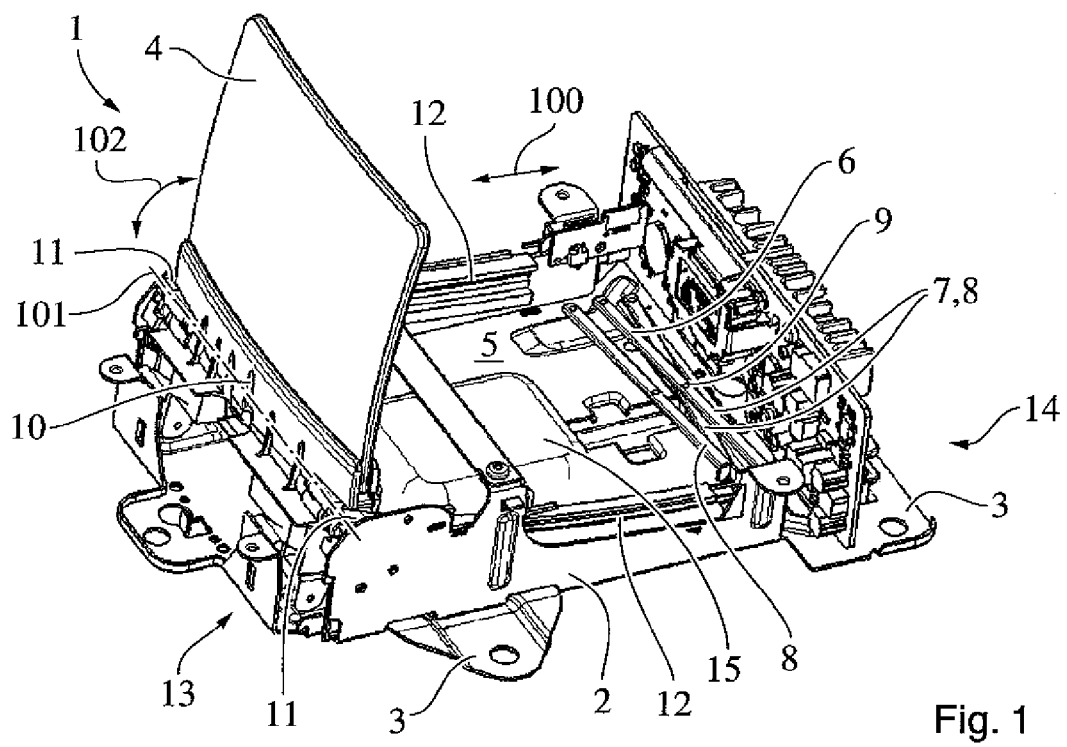
FIG. 1 is a schematic perspective view of a display device according to an exemplary embodiment of the present invention.

The combiner 4 is moved by means of a drive mechanism between the position for use and the stowed position. The drive mechanism comprises in this instance a scissor articulation 6. The scissor articulation 6 has a large number of members 7 which are arranged one behind the other, each member 7 having at least two rods 8 which are arranged in a crossed manner (also referred to as scissor members) and which are each rotatably connected to each other, for example, over half a length. The scissor articulation 6 comprises at a first end a first member 7, the two rods 8 of the first member 7 being connected to each other at an intersection location 9 in a rotationally movable manner. A linear drive 15 of the display device 1 engages at this intersection location 9, while an end location of the rods 8 is fixed to the base element 2 in a rotationally movable manner and the other end location is displaceably supported in each case. In order to actuate the scissor articulation 6, the intersection location 9 is moved by means of the linear drive 15 in the longitudinal direction 100. The scissor articulation 6 consequently acts in particular as a translation means in order to translate a comparatively small movement of the linear drive 9 in the longitudinal direction 100 into a substantially larger movement of the scissor articulation 6 in the longitudinal direction 100. To this end, the scissor articulation 6 has a second member 7 which is arranged at an end of the scissor articulation 6 remote from the first member 7 in the longitudinal direction 10. The end locations 16 of the two rods 8 of the second member are secured to the securing means 10. Between the first and the second member 7, a plurality of additional members 7 are preferably arranged and are not illustrated purely for reasons of clarity.

The combiner 4 is further retained by means of the securing element 10. The securing element 10 is supported so as to be able to be moved relative to the base element 2 in the longitudinal direction 100. To this end, the securing element 10 has lateral guiding elements 11 which are guided in lateral guiding rails 12 of the base element 2 so as to be able to be longitudinally displaced. The guiding rails 12 are curved with respect to the longitudinal direction 100 in such a manner that the spacing between the guiding rails 12 and the base plate 5 changes preferably continuously in the longitudinal direction 100. The guiding elements 11 are further rotatably supported in the guiding rails 12 so that the combiner 4 can be pivoted about a pivot axis 101 defined by the guiding elements 11 (indicated by the arrow 102). A side of the securing element 10 opposite to the combiner 4 with respect to the pivot axis 101 is secured to the second member 7 at least at one securing location.

DETAILED DESCRIPTION

When the combiner 4 is located in the stowed position, the securing element 10 is arranged at a first end 13 of the base element 2 facing away from the opening of the interior equipment component in the longitudinal direction 100. In order to move the combiner 4 into the position for use, the scissor articulation 6 is driven by means of the linear drive 15 in such a manner that the securing element 10 is moved from a first end 13 of the base element 2 in the direction of a second end 14 of the base element 2 in the longitudinal direction 100. As a result of the curvature of the guiding rails 12, the guiding rail 12 moves away from the base plate 5 so that, in addition to the linear movement in the longitudinal direction 100, an upward pivot movement of the securing element 10 about the pivot axis 101 is also produced. Furthermore, the combiner 4 is also thereby pivoted about the pivot axis 101 and consequently pushed into the field of vision of the vehicle occupant through the opening of the interior equipment component (not illustrated), which opening is arranged in the region of the second end 14, and at the same time raised. The movement of the combiner 4 from the position for use into the stowed position is carried out in a similar manner, the linear drive 15 being driven in the opposite direction in this instance.

According to an alternative embodiment, there is provision for the scissor articulation 6 and in particular the members 7 or rods 8 to be produced from a material which comprises a shape memory alloy (also referred to as SMA material, shape memory alloy). Preferably, the drive further has a control unit which is configured to apply a control current to the shape memory alloy. In this manner, owing to selective application of current, the defined movement within the required trajectories of the scissor articulation 6 and consequently of the combiner 4 is brought about in the longitudinal direction 100. It is also conceivable for new types of materials, for example, SMA, EAP, to be combined with conventional electromotive or spring-operated drives in order to reproduce functional principles of nature (in specific terms: Bryozoa) and, according to transfer functions from bionics, to convert them into a technical solution for the present combiner drive.

Figure 2:
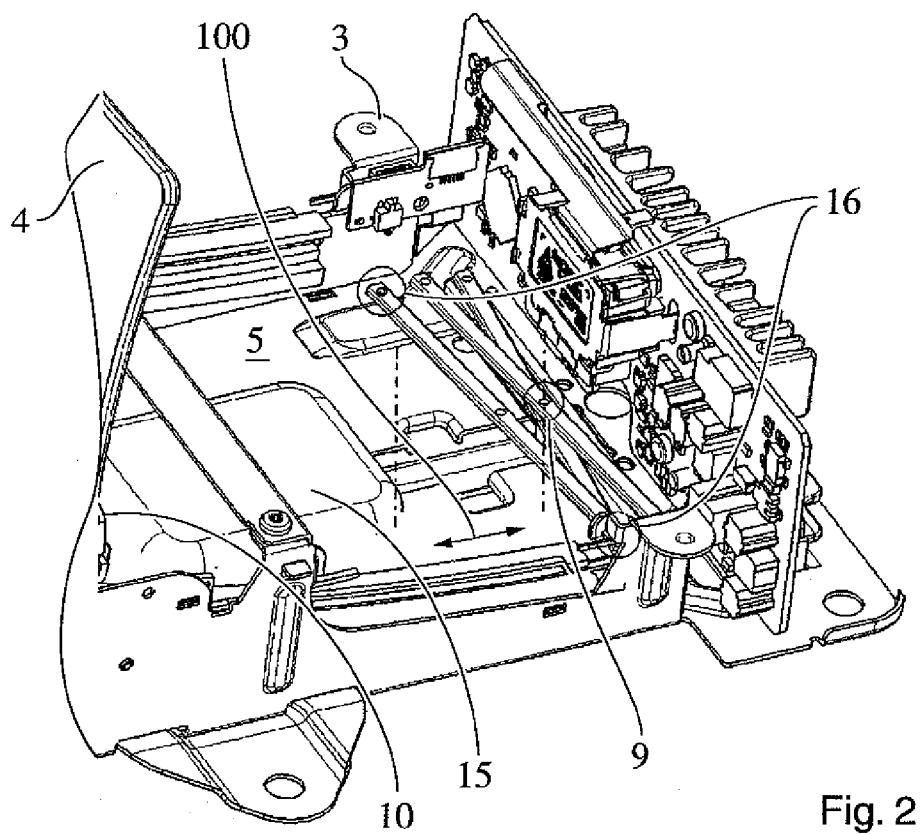
FIG. 2 is a schematic detailed view of a display device according to the exemplary embodiment of the present invention.
Figure 3:
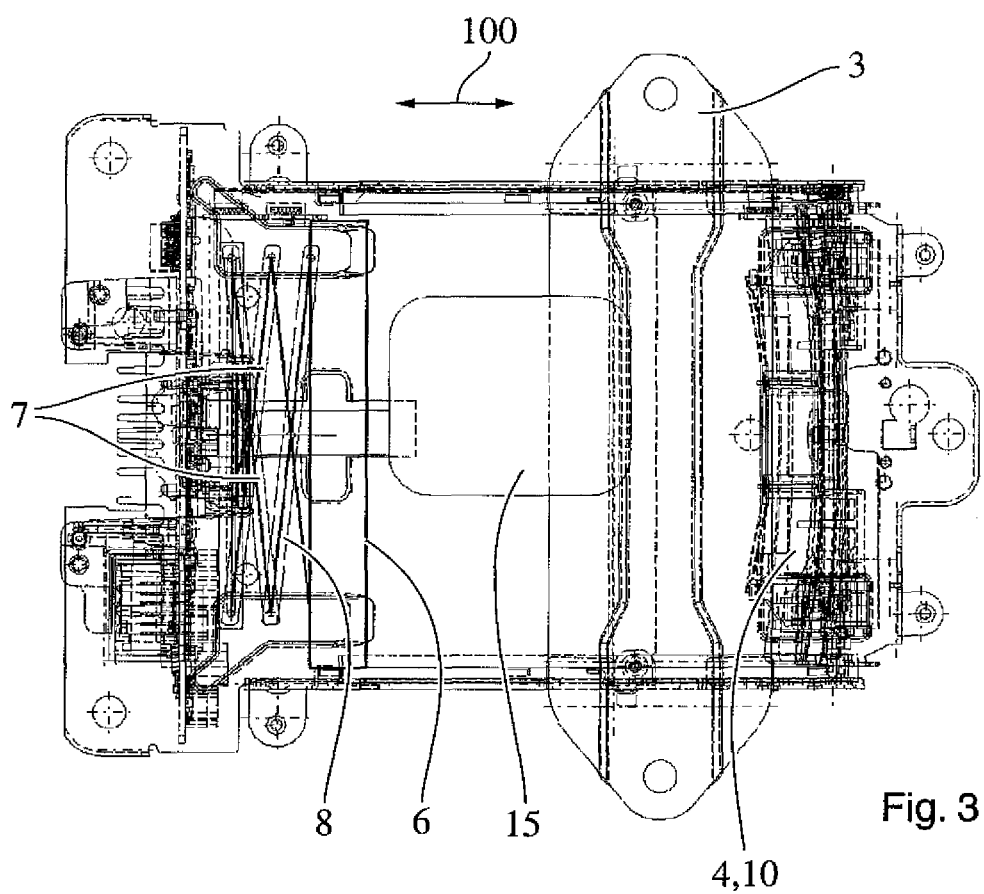
FIG. 3 is a schematic plan view of a display device according to the exemplary embodiment of the present invention.

FIG. 3 is a plan view of the display device 1 shown in FIGS. 1 and 2.

LIST OF REFERENCE NUMERALS

1 Display device
2 Base element
3 Securing flap
4 Combiner
5 Base plate
6 Scissor articulation
7 Member
8 Rod
9 Intersection location
10 Securing element
11 Guiding element
12 Guiding rail
13 First end
14 Second end
15 Linear drive
16 End locations
100 Longitudinal direction
101 Pivot axis
102 Pivot movement

The invention claimed is:

1. A display device comprising: a base element; and a combiner which can be moved relative to the base element, wherein the combiner moves by a drive mechanism between a position for use, in which a virtual image can be projected onto the combiner, and a stowed position, wherein the drive mechanism comprises a translation mechanism, wherein the translation mechanism is a scissor mechanism; wherein the scissor mechanism includes a scissor articulation including an arrangement of at least two rods, the at least two rods each including an end location, the at least two rods forming a scissor member, the at least two rods rotatably connected to each other in a central region of each rod at an intersection location of the scissor member;

wherein the drive mechanism includes a drive engaged to the intersection location in order to move the combiner between the position for use and the stowed position by moving the intersection locating in a longitudinal direction; and wherein the scissor articulation is compressible in the longitudinal direction into a retracted position when the end locations of the at least two rods are separated from each other in a transverse direction perpendicular relative to the longitudinal direction.

2. The display device as claimed in claim 1, wherein the combiner carries out a linear movement and a rotation movement when moving from the position for use into the stowed position.

3. The display device as claimed in claim 2, wherein the same drive is provided for the linear movement and the rotation movement.

4. The display device as claimed in claim 2, wherein the movement of the combiner is carried out along a curved guide.

5. The display device as claimed in claim 4, wherein the combiner is supported in the guiding rail by a rotatable guiding element.

6. The display device as claimed in claim 5, wherein the guiding element has two guide means which are supported separately from each other in the guiding rail and which are moved along different paths when the combiner is moved.

7. The display device as claimed in claim 5, wherein a rotary bearing is provided on the guiding element.

8. The display device as claimed in claim 1, wherein the drive mechanism comprises a linear motor or a rotary drive.

9. The display device as claimed in claim 1, wherein the drive mechanism is at least partially produced from a material which comprises a shape memory alloy, wherein the drive mechanism preferably has a control unit, which is configured to apply a control current to the shape memory alloy.

* * * * *